United States Patent [19]

Campbell et al.

[11] 4,432,596
[45] Feb. 21, 1984

[54] INFRA-RED OPTICAL SYSTEMS

[75] Inventors: Duncan R. J. Campbell, Dyserth; Philip J. Rogers, Bodelwyddan, both of Wales

[73] Assignee: Pilkington P.E. Limited, St. Helens, England

[21] Appl. No.: 282,236

[22] Filed: Jul. 10, 1981

[30] Foreign Application Priority Data

Jul. 24, 1980 [GB] United Kingdom ............... 8024210

[51] Int. Cl.³ .............................................. G02B 3/00
[52] U.S. Cl. ...................................... 350/1.3; 350/1.4
[58] Field of Search ............................ 350/1.2–1.4, 350/410, 418

[56] References Cited

U.S. PATENT DOCUMENTS

4,050,779 9/1977 Fleischman .......................... 350/1.2
4,201,440 5/1980 Yuta ..................................... 350/1.2
4,383,727 5/1983 Rogers ................................. 350/1.3

Primary Examiner—Bruce Y. Arnold
Attorney, Agent, or Firm—F. Eugene Davis, IV

[57] ABSTRACT

An "eye-piece" system for an infra-red afocal telescope comprises a back element of positive power having a convex front surface and a curved back surface, and a pair of elements closely spaced to define a gas lens therebetween, the front element of the pair having a concave front surface whose radius of curvature is equal to or greater than that of the convex back surface of the back element of the pair, the pair of elements in combination with the gas lens therebetween being of positive power. The "eye-piece" system can be used in combination with an objective lens system, which may be catadioptric or all refractive, to provide a collimated magnified view of a scene or object, from which infrared radiation is received, at a real exit pupil where a scanner operates.

24 Claims, 5 Drawing Figures

INFRA-RED OPTICAL SYSTEMS

BACKGROUND OF THE INVENTION

This invention concerns improvements in or relating to infra-red optical systems and relates more particularly to afocal optical systems for use at infra-red wavelengths.

Afocal optical systems, i.e. systems having an infinite focal length and therefore no apparent focussing action, are well known per se and are used in several applications. The present invention relates to such a system which can be used, in particular, in circumstances where it is required that a beam of infra-red radiation from a distant source and incident on the optical system be reduced in diameter. Such reduction of beam diameter enables a comparatively small, high speed reflective scanning system to be employed in order to provide the requisite scanning of the field of view across an imaging lens plus detector array.

An optical scanning head of constant angular motion has to operate in a collimated radiation section in order to maintain focus across the field of view and minimise image distortion. An essential in order to prevent vignetting is that the exit pupil of the afocal system should be coincident with the operative facet of the scanning head, i.e. its in-action reflective facet. In order to give a good field of view in the real world and also to minimise the number of facets on the scanning head a wide field of view is required in the image space of the afocal system. The afocal optical system must, therefore, be capable of providing a wide image space field angle at an external exit pupil that is situated a convenient distance after the last optical element of the system.

Further, the space in which the afocal system is to be fitted is usually very limited, and this introduces a requirement for a compact length. Also, the image quality given by the afocal system should be close to the limit set by diffraction as this quality is not particularly high because of the long wavelength of the infra-red radiation.

It has previously been proposed in U.S. Pat. No. 4,199,217 to provide an "eye-piece" system for a non-Gallilean afocal infra-red optical system, otherwise referred to as an infra-red afocal telescope, which "eye-piece" system comprises a back lens element of positive power having a back surface which is convex or concave and a front surface which is convex, and a front lens element which is of meniscus form having a back surface which is convex and a front surface which is concave with the radius of curvature of the convex back surface greater than that of the concave front surface but the thickness of the front element being such as to give it positive power.

In that patent, and in the present description, the term "eye-piece" is used although the ultimate image is not viewed by the human eye but is, for example, scanned across an infra-red detector array, and the term is to be construed accordingly. Also in that patent, and in the present description, the front of the system is considered to face towards the scene or object from which infra-red radiation is received while the back of the system is considered to face towards the exit pupil. The terms front and back when used in particular in relation to elements of the system and to the surfaces of such elements are to be construed accordingly.

SUMMARY

According to the present invention there is provided an "eye-piece" system for use in a non-Gallilean afocal infra-red optical system or afocal infra-red telescope, the "eye-piece" system comprising at least three lens elements including a back element of positive power having a front surface which is convex and a curved back surface, and a pair of elements which are closely spaced to define a gas lens therebetween, the back element of the pair having a convex back surface and the front element of the pair having a concave front surface whose radius of curvature is equal to or greater than that of the convex back surface of the back element of the pair, the pair of elements in combination with the gas lens therebetween being of positive power.

Preferably said curved back surface of said back element of positive power has a radius of curvature less than that of the concave front surface of the front element of the pair, and is preferably a concave surface. Said back element of positive power may be shaped for reduction or minimisation of narcissus effects, as also may be the other element of the "eye-piece" system, the overall distribution of aberration correction being such as to give a balance.

Preferably said pair of elements comprises a front element of negative power, preferably of meniscus form with a convex back surface of greater radius of curvature than its concave front surface, and a back element of positive power, preferably of meniscus form with a concave front surface of greater radius of curvature than its convex back surface. The gas lens between the elements of the pair is preferably of negative power being preferably bounded at the back by a front concave surface of the back element of the pair and at the front by a back convex surface of the front element of the pair of greater radius of curvature than the front concave surface of the back element of the pair.

The "eye-piece" system may have an associated field or corrector lens element of positive power located close to or at a reasonable distance from the position of the intermediate image formed in the optical system or telescope.

The present invention further provides a non-Gallilean afocal infra-red optical system or afocal infra-red telescope comprising an objective lens system in combination with an "eye-piece" system as set forth above. The powered elements of the objective lens system may all be refracting elements or the objective lens system may be a catadioptric system including reflecting powered elements.

The lens elements may for example be of germanium for the thermal 8 to 13 micron waveband, or for example a combination of silicon and germanium may be used for the 3 to 5.5 micron waveband. Conveniently the spaces between elements are occupied by air, the previously mentioned gas lens then being an air lens. Preferably the curved refractive surfaces of all the elements and, where there are reflecting powered elements the curved reflecting surfaces, are of spherical curvature.

The present invention further provides an infra-red optical system comprising an objective lens system for producing a real image from infra-red radiation from a distance scene or object, an "eye-piece" system as set forth above arranged to receive infra-red radiation from that image and to provide a collimated magnified view of the scene or object at a real exit pupil, and scanning means operative at the exit pupil to scan the collimated magnified view via imaging means across infra-red detector means.

BRIEF DESCRIPTION OF THE DRAWINGS

Embodiments of non-Gallilean afocal infra-red optical systems or infra-red afocal telescopes in accordance with the invention will now be described by way of example with reference to the accompanying drawings in which.

DESCRIPTION OF THE PREFERRED EMBODIMENTS

Figure 1:
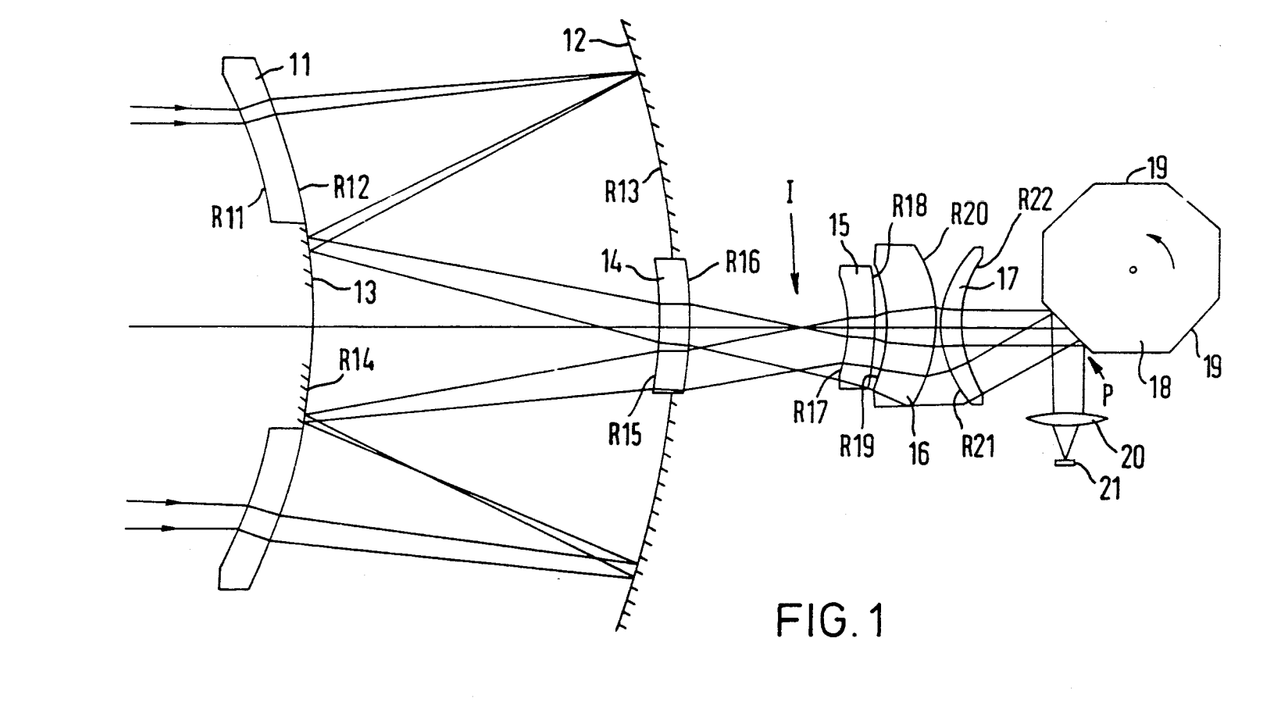
FIG. 1 is a schematic representation of a first embodiment.

FIG. 1 schematically shows an embodiment having a catadioptric objective lens system including reflecting powered elements. The catadioptric objective comprises a negative meniscus element 11 having a concave front surface R11 and a convex back surface R12, a primary mirror 12 having a front concave reflecting surface R13, and a secondary mirror 13 having a convex reflecting surface R14 which is in practice a portion of the back surface R12 of the element 11. Thus, the reflecting surface R14 of the secondary mirror 13 is an annular area round a central portion of surface R12, the central portion itself not being reflective in order to avoid or reduce undesirable "narcissus" effects. A positive meniscus element 14 having a concave front surface R15 and a convex back surface R16 is located in a central aperture in the primary mirror 12. This element 14 acts as a field or correcting lens element associated with the "eye-piece" system described below.

As will be well understood by those skilled in the art, infra-red radiation from a distant scene or object is transmitted through the annular outer portion of the element 11 with refraction at surfaces R11 and R12, is then reflected from the concave surface R13 of the primary mirror 12 towards the secondary mirror 13 from whose convex surface R14 it is reflected towards the central aperture in the primary mirror 12 to be transmitted through the element 14 with refraction at the surfaces R15 and R16. A real image is formed at position I and constitutes an intermediate image in the overall optical system or telescope.

The "eye-piece" system in the FIG. 1 embodiment comprises a pair of elements 15 and 16 and a back element 17. The front elements 15 of the pair is a negative meniscus element having a front concave surface R17 and a back convex surface R18 of greater radius of curvature than the front concave surface R17. The back element 16 of the pair is a positive meniscus element having a front concave surface R19 and a back convex surface R20. The elements 15 and 16 are closely spaced to define a gas lens of negative power therebetween. The gas lens is bounded by surfaces R18 and R19, the radius of curvature of surface R18 being greater than that of surface R19. The pair of elements 15 and 16 in combination with the gas lens therebetween is of positive power.

The back element 17 is a positive meniscus element having a front convex surface R21 and a back concave surface R22.

The "eye-piece" system receives radiation from the intermediate image I and, by transmission of the radiation through the elements 15, 16 and 17 with refraction at the surfaces R17 to R22, provides a collimated magnified view of the scene or object at a real exit pupil P.

FIG. 1 schematically shows, for purposes of illustration, an optical scanning head 18 having a plurality of relative facets 19 and which is rotated at constant angular velocity about a fixed axis orthogonal to the plane of FIG. 1. The head 18 is positioned so that the operational or in-action facet 19 is situated coincident with the exit pupil P. As the head rotates the facet scans the collimated radiation via an imaging lens 20 across an infra-red detector array 21, successive scans being effected by successive facets passing through the exit pupil position.

A particular example of afocal telescope in accordance with the FIG. 1 embodiment has numerical data as follows. The dimensional units are millimeters but the values are relative and can be scaled accordingly. All the surfaces R11 to R22 are of spherical curvature. The example is designed to operate in the thermal 8 to 13 micron waveband and the material of the refracting elements 11, 14, 15, 16 and 17 is germanium. The reflecting surfaces R13 and R14 are suitably coated to effect the required reflection. The elements are air spaced and the gas lens between elements 15 and 16 is thus an air lens. It will be noted that in this example the radius of curvature of surface R17 is greater than that of R20.

EXAMPLE 1

| Element | Surface | Radius of Curvature | Axial Thickness/ Separation |
|---|---|---|---|
| 11 | R11 | −138.0862 | |
| | | | 7.5 |
| | R12 | −159.2796 | |
| | | | 86.9752 |
| 12 | R13 | −217.2779 | |
| | | | −86.9752 |
| 13 | R14 | −159.2796 | |
| | | | 83.3621 |
| | R15 | −88.2180 | |
| 14 | | | 7.2 |
| | R16 | −80.7690 | |
| | | | 38.3071 |
| | R17 | −44.7180 | |
| 15 | | | 6.8 |
| | R18 | −89.5669 | |
| | | | 2.54 |
| | R19 | −44.3003 | |
| 16 | | | 12.2 |
| | R20 | −36.7068 | |
| | | | 0.25 |
| | R21 | 28.0132 | |
| 17 | | | 4.5 |
| | R22 | 30.4512 | |

Magnification (nominal) ×11.4
Field of View ±36 degrees in scanner space
Exit Pupil Diameter (nominal) 10 millimeters In this example the "eye-piece" system is designed having regard to the narcissus effect. This effect, simply described as the reflection from one or more lens surfaces of the cold detector elements back on themselves, can give rise to degradation of the observed scene generally by reduction of contrast. Narcissus effects usually, but not always, affect the centre of the observed scene. Where an anti-reflection coating of high efficiency, and low reflectivity (and usually low durability) can be employed on the lens surface facing the scanner, then the degree of narcissus can be tolerably low.

In the situation where a high degree of correction of the narcissus effect is required, for example where high durability, high reflectivity, low efficiency anti-reflection coatings must be used on the lens surface R22 nearest the scanner, the positive lens element 17 nearest the scanner must be given an extreme meniscus shape with the concave surface R22 facing the scanner. It should be noted, however, that it is not necessary to make the meniscus shape so extreme that either or both of the lens surfaces R21 and R22 be concentric with the exit pupil. The extreme meniscus shape has adverse effects on the off-axis aberrations, notably coma, but it reduces the high level of undercorrect pupil spherical aberration that would otherwise be present. Pupil spherical aberration needs to be controlled to a moderate level in such afocals. The aberration balance can be restored by the choice of shapes for the "eye-piece" elements and the lowering of the level of pupil spherical aberration avoids the need for a very high level of overcorrect pupil spherical aberration to be produced at the front concave surface R17 of the front element 15 of the pair of elements 15 and 16. This surface R17 can thus have a radius of curvature greater than (or, as will be apparent from a later example, equal to) that of the back convex surface R20 of the back element 16 of the pair of elements 15 and 16.

The positive lens element 14, referred to above as a field or correcting lens element, located at a reasonable distance from (or, as will be apparent from a later example, close to) the intermediate image I, can serve both to assist in correction of aberration and, by virtue of its power, to increase the level of overcorrect pupil spherical aberration at the concave front surface R17 of the front element 15 of the pair of elements 15 and 16 by increasing the angle of incidence of the principal ray.

It should be noted that it is not only the element 17 nearest the scanner that is shaped for reduction or minimisation of narcissus effects. Other elements of the "eye-piece" system are also shaped for such reduction or minimisation, with resultant overall distribution of aberration correction, and the shapes of the several elements are arranged to give a balance.

Figure 2:
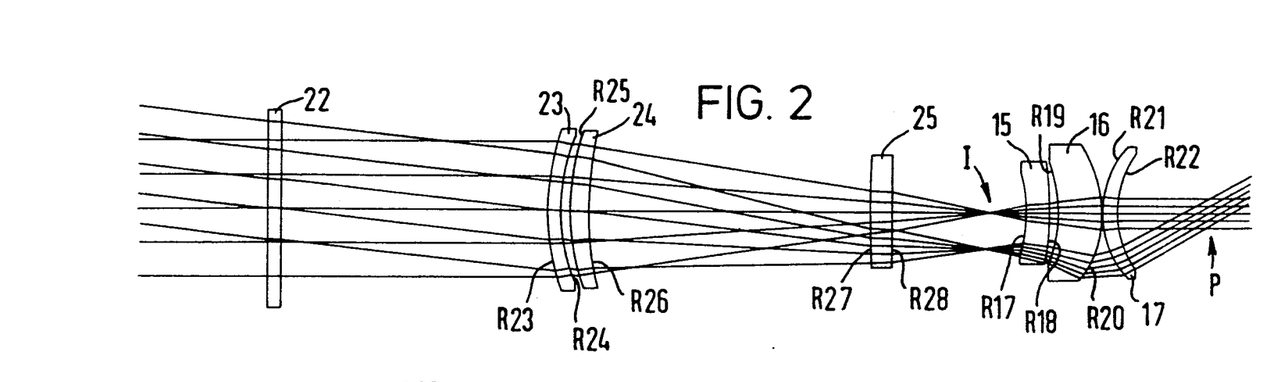
FIG. 2 is a schematic representation of a second embodiment.

FIG. 2 schematically shows an embodiment having a refractor objective lens system, i.e. the powered elements of the objective lens system are all refracting elements. FIG. 2 shows a front planar window 22 through which infra-red radiation from the distant scene or object passes to two meniscus elements 23 and 24, the front element 24 being of negative power having a front convex surface R23 and a back concave surface R24, and the back element 24 having a front convex surface R25 and a back concave surface R26. There is then a weakly positive field or correcting lens element 25 having convex surfaces R27 and R28. This element 25 serves a similar purpose to the element 14 of FIG. 1. The elements 23, 24 and 25 focus the received infra-red radiation to produce a real intermediate image I. This image is "viewed" by an "eye-piece" system which is the same as that of FIG. 1.

A particular example of afocal telescope in accordance with the FIG. 2 embodiment has numerical data as follows. The dimensional units are millimeters but the values are relative and can be scaled accordingly. All the curved refracting surfaces are of spherical curvature. The example is designed to operate in the thermal 8 to 13 micron waveband and all the elements are of germanium and are air spaced.

EXAMPLE 2

| Element | Surface | Radius of Curvature | Axial Thickness/ Separation |
|---|---|---|---|
| 23 | R23 | 70.848 | |
| | | | 3.765 |
| | R24 | 58.69 | |
| | | | 2.54 |
| 24 | R25 | 68.927 | |
| | | | 5.5883 |
| | R26 | 98.8331 | |
| | | | 81.4045 |
| 25 | R27 | 372.363 | |
| | | | 6.35 |
| | R28 | −6680.6943 | |
| | | | 38.1 |
| 15 | R17 | −44.7180 | |
| | | | 6.8 |
| | R18 | −89.5669 | |
| | | | 2.54 |
| 16 | R19 | −44.3003 | |
| | | | 12.2 |
| | R20 | −36.7068 | |
| | | | 0.25 |
| 17 | R21 | 28.0132 | |
| | | | 4.5 |
| | R22 | 30.4512 | |

Magnification (nominal) ×4.6
Field of View ±36 degrees in scanner space
Exit Pupil Diameter (nominal) 10 millimeters It will be seen that the "eye-piece" system formed by elements 15, 16 and 17 of Example 2 is identical to that of Example 1. Thus Examples 1 and 2 can be combined into a dual field of view system having a single common "eye-piece" and a switching device, such as a mirror or prism, disposed in the optical path between the "eye-piece" front element 15 and the lens element 14 of Example 1 or the lens element 25 of Example 2, whereby the system can be switched so that the "eye-piece" receives light from the catadioptric objective of Example 1, providing a relatively narrow field of view, or from the refractor objective of Example 2, providing a relatively wide field of view.

Figure 3:
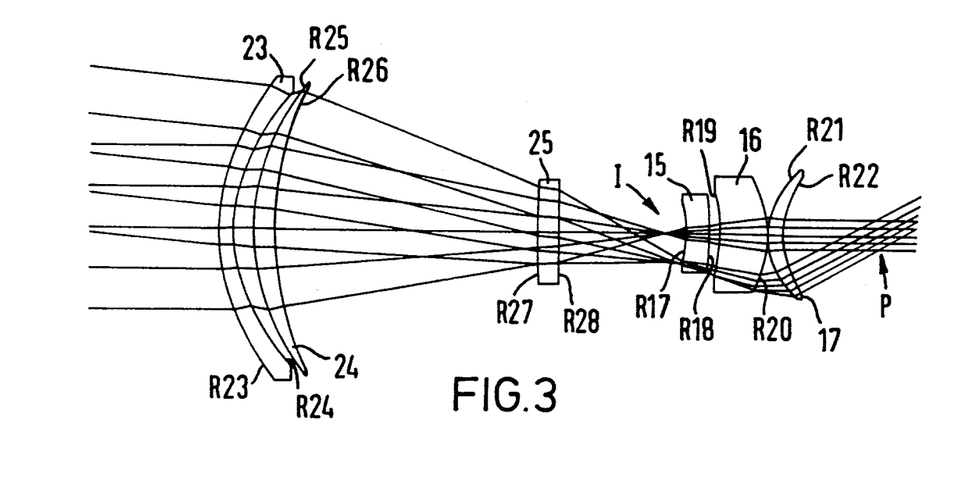
FIG. 3 is a schematic representation of a third embodiment.

A further embodiment having a refractor objective is schematically shown in FIG. 3. The basic configuration and arrangement of lens elements is similar to that of FIG. 2 and the same references are therefore employed. However, FIG. 3 does not show any planar window 22.

A particular example of afocal telescope in accordance with the FIG. 3 embodiment and designed to operate in the 3 to 5.5 micron has numerical data as follows. The dimensional units are again millimeters, but the values are relative and can be scaled accordingly, and all the curved refracting surfaces are of spherical curvature. The material of the elements 23, 25, 15, 16 and 17 is silicon while element 24 is of germanium, and the elements are air spaced.

EXAMPLE 3

| Element | Surface | Radius of Curvature | Axial Thickness/ Separation |
|---|---|---|---|
| 23 | R23 | 71.5668 | |
| | | | 3.7446 |
| | R24 | 57.2219 | |
| | | | 5.5898 |
| 24 | R25 | 68.8225 | |
| | | | 6.0 |

-continued

| Element | Surface | Radius of Curvature | Axial Thickness/Separation |
|---|---|---|---|
| | R26 | 97.2005 | |
| | | | 75.8214 |
| 25 | R27 | 273.4474 | |
| | | | 6.35 |
| | R28 | −4597.7524 | |
| | | | 36.7173 |
| 15 | R17 | −43.1559 | |
| | | | 6.8 |
| | R18 | −103.7221 | |
| | | | 2.6457 |
| 16 | R19 | −55.3904 | |
| | | | 13.8148 |
| | R20 | −36.5331 | |
| | | | 0.25 |
| 17 | R21 | 25.0986 | |
| | | | 4.5 |
| | R22 | 30.4513 | |

Figure 4:
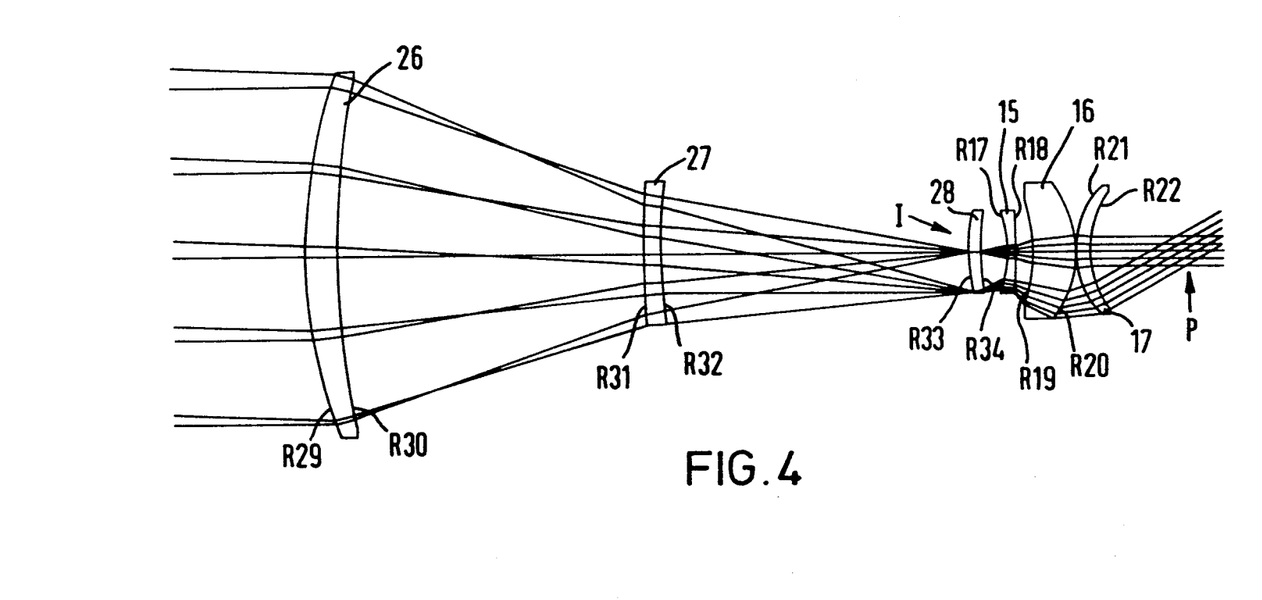
FIG. 4 is a schematic representation of a fourth embodiment.

Magnification (nominal) ×6
Field of View ±36 degrees in scanner space
Exit Pupil Diameter (nominal) 10 millimeters FIG. 4 schematically shows a further embodiment having a refractor objective which in this case comprises a front positive meniscus element 26 having a front convex surface R29 and a back concave surface R30, and a back negative meniscus element 27 having a front convex surface R31 and a back concave surface R32. There then follows a positive field or correcting lens element 28 which serves a similar purpose to the element 14 of FIG. 1 and the element 25 of FIGS. 2 and 3. However, in FIG. 4 the element 28 is meniscus with a convex front surface R33 and a concave back surface R34 and is located close to, and in fact virtually at, the position of the intermediate image I.

The "eye-piece" system of FIG. 4 is of basically similar configuration to that of FIGS. 1, 2 and 3 and the same references are used. However, in the FIG. 4 embodiment the front concave surface R17 of the front element 15 of the pair of elements 15 and 16 has a radius of curvature equal to that of the back convex surface R20 of the back element 16 of the pair.

A particular example of afocal telescope in accordance with the FIG. 4 embodiment has numerical data as follows. The dimensional units are millimeters, but the values are relative and can be scaled accordingly. All the curved refracting surfaces are of spherical curvature. All the elements are of germanium and are air spaced and the example is designed to operate in the 8 to 13 micron waveband.

EXAMPLE 4

| Element | Surface | Radius of Curvature | Axial Thickness/Separation |
|---|---|---|---|
| 26 | R29 | 159.1069 | |
| | | | 8.9619 |
| | R30 | 238.2525 | |
| | | | 88.85 |
| 27 | R31 | 281.1277 | |
| | | | 5.08 |
| | R32 | 149.2209 | |
| | | | 87.814 |
| 28 | R33 | 54.5642 | |
| | | | 3.81 |
| | R34 | 105.2138 | |
| | | | 7.62 |
| 15 | R17 | −34.0261 | |
| | | | 2.54 |
| | R18 | −263.2878 | |

| Element | Surface | Radius of Curvature | Axial Thickness/Separation |
|---|---|---|---|
| | | | 4.8014 |
| 16 | R19 | −49.9219 | |
| | | | 12.0382 |
| | R20 | −34.0261 | |
| | | | 0.25 |
| 17 | R21 | 27.0365 | |
| | | | 4.1065 |
| | R22 | 29.1954 | |

Magnification (nominal) ×11.4
Field of View ±36 degrees in scanner space
Exit Pupil Diameter 10 millimeters (nominal)

Figure 5:
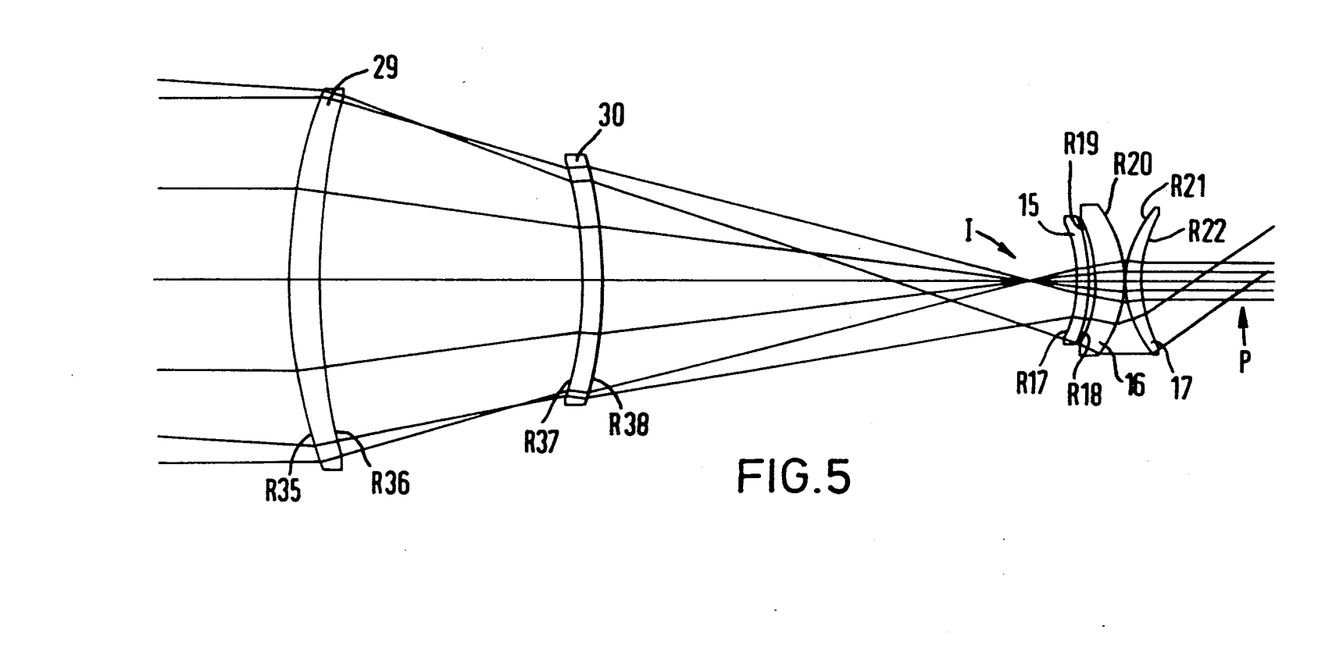
FIG. 5 is a schematic representation of a fifth embodiment.

FIG. 5 schematically shows another embodiment having a refractor objective, which in this case comprises a front positive meniscus element 29 having a front positive meniscus element 29 having a front convex surface R36, and a back weakly negative meniscus element 30 having a front concave surface R37 and a back convex surface R38. The "eye-piece" system of FIG. 5 is of basicaly similar configuration to that of the other figures and the same references are used. The FIG. 5 embodiment does not have any field or corrector lens element correponding to element 14 of FIG. 1, element 25 of FIGS. 2 and 3, or element 28 of FIG. 4.

A particular example of afocal telescope in accordance with the FIG. 5 embodiment has numerical data as follows. The dimensional units are millimeters but the values are relative and can be scaled accordingly. All the curved refracting surfaces are of spherical curvature. All the elements are of germanium and are air spaced and the example is designed to operate in the 8 to 13 micron waveband.

EXAMPLE 5

| Element | Surface | Radius of Curvature | Axial Thickness/Separation |
|---|---|---|---|
| 29 | R35 | 163.93456 | |
| | | | 8.8545 |
| | R36 | 218.9659 | |
| | | | 76.60999 |
| 30 | R37 | −137.4706 | |
| | | | 5.7571 |
| | R38 | −145.4383 | |
| | | | 136.9784 |
| 15 | R17 | −45.0241 | |
| | | | 3.4948 |
| | R18 | −57.0621 | |
| | | | 1.8163 |
| 16 | R19 | −42.5843 | |
| | | | 8.3768 |
| | R20 | −37.4844 | |
| | | | 0.25 |
| 17 | R21 | 34.3084 | |
| | | | 4.3137 |
| | R22 | 43.0330 | |

Magnification (nominal) ×9.7
Field of View ±36 degrees in scanner space
Exit Pupil Diameter (nominal) 10 millimeters It will be noted that in all the above examples the radius of curvature of the curved back surface R22 of the back element 17 of positive power has a radius of curvature less than that of the concave front surface R17 of the front element 15 of the pair of elements 15 and 16.

From the foregoing, it will be seen that an "eye-piece" system in accordance with the invention can be used with a purely refracting objective, as illustrated by the embodiments of FIGS. 2 to 5 and Examples 1 to 5 respectively in accordance therewith, or a catadioptric objective, as illustrated by the embodiment of FIG. 1 and Example 1 in accordance therewith; can be used for different wavebands and particularly the 8 to 13 micron waveband as illustrated by Examples 1, 2, 4 and 5 or the 3 to 5.5 micron waveband as illustrated by Example 3; may have an associated field or corrector lens located at or close to the intermediate image position, as illustrated by the FIG. 4 embodiment and Example 4 in accordance therewith, or at a reasonable distance from the intermediate image position, as illustrated by the embodiments of FIGS. 1, 2 and 3 and Examples 1, 2 and 3 in accordance therewith, but need not necessarily have such associated field or corrector lens as illustrated by the FIG. 5 embodiment and Example 5 in accordance therewith. It will further be appreciated that the embodiments and examples specifically shown and described are given by way of illustration and example and the invention in its broader aspects is not limited thereto. In particular it will be understood that although in these specific embodiments and examples the back curved surface of the back element 17 of the "eye-piece" system is described as concave, which can be of advantage relative to "narcissus" effects, this surface could in some circumstances be convex and the element 17 bi-convex instead of meniscus. Also, the element 17 could be further spaced from the element 16 than in the above examples. Also, although in the specific embodiments and examples the back surface R18 of the front element 15 of the pair of elements 15 and 16 is described as convex, this surface R18 could be planar or concave. Further, although germanium (refractive index N of 4.00119 at 10.6 microns and constringence of V value of 1004 at 8.5 to 12.5 microns) is the preferred lens element material for the 8 to 13 micron waveband and a combination of silicon (refractive index N of 3.4284 at 3.5 microns and constringence or V value of 289 at 3.0 to 4.5 microns) with germanium for the 3 to 5.5 micron waveband, it will be understood that other infrared transmitting materials could be employed.

We claim:

1. An "eye-piece" system for use in a non-Gallilean afocal infra-red optical system or an afocal infra-red telescope in which an intermediate image is formed, the "eye-piece" system comprising at least three lens elements of infra-red transmitting material operative with radiation in at least one of the 3 to 5.5 and 8 to 13 micron wavebands, the three lens elements including a back element of positive power having a front surface which is convex and a curved back surface, and a pair of elements which are closely spaced to define a gas lens therebetween, the back element of the pair having a convex back surface and the front element of the pair having a concave front surface with an absolute value of radius of curvature equal to or greater than that of the convex back surface of the back element of the pair, the pair of elements in combination with the gas lens therebetween being of positive power.

2. An "eye-piece" system according to claim 1 in which said curved back surface of said back element of positive power has a radius of curvature whose absolute valve is less than that of the concave front surface of the front element of the pair.

3. An "eye-piece" system according to claim 1 or claim 2 in which said curved back surface of said back element of positive power is a concave surface.

4. An "eye-piece" system according to claim 1 in which said pair of elements comprises a front element of negative power and a back element of positive power.

5. An "eye-piece" system according to claim 4 in which said front element of negative power is of meniscus form with a convex back surface whose radius of curvature has an absolute value greater than that of its convex back surface.

6. An "eye-piece" system according to claim 4 or claim 5 in which said back element of positive power is of meniscus form with a concave front surface whose radius of curvature has an absolute value greater than that of its convex back surface.

7. An "eye-piece" system according to claim 1 in which the gas lens between the elements of the pair is of negative power.

8. An "eye-piece" system according to claim 7 in which said gas lens is bounded at the back by a front concave surface of the back element of the pair and at the front by a back convex surface of the front element of the pair having a radius of curvature with an absolute value greater than that of the front concave surface of the back element of the pair.

9. An "eye-piece" system according to claim 1 having an associated field or corrector lens element of positive power.

10. The invention of claim 1 and further comprising an objective lens system for collecting and transmitting infra-red radiation thereto, the combination being for use as a non-Gallilean afocal infra-red optical system or afocal infra-red telescope.

11. The invention of claim 10 in which the powered elements of the objective lens system are all refracting elements.

12. The invention of claim 11 comprising lens elements 23, 24, 25, 15, 16 and 17 whose surfaces R23 to R28 and R17 to R22 have radii of curvature, and whose elements have axial thicknesses and separations, substantially as follows:

| Element | Surface | Radius of Curvature | Axial Thickness/ Separation |
|---------|---------|---------------------|------------------------------|
| 23 | R23 | 70.848 | |
| | | | 3.765 |
| | R24 | 58.69 | |
| | | | 2.54 |
| 24 | R25 | 68.927 | |
| | | | 5.5883 |
| | R26 | 98.8331 | |
| | | | 81.4045 |
| 25 | R27 | 372.363 | |
| | | | 6.35 |
| | R28 | −6680.6943 | |
| | | | 38.1 |
| 15 | R17 | −44.7180 | |
| | | | 6.8 |
| | R18 | −89.5669 | |
| | | | 2.54 |
| 16 | R19 | −44.3003 | |
| | | | 12.2 |
| | R20 | −36.7068 | |
| | | | 0.25 |
| 17 | R21 | 28.0132 | |
| | | | 4.5 |
| | R22 | 30.4512 | |

13. The invention of claim 11 comprising lens elements 23, 24, 25, 15, 16 and 17 whose surfaces R23 to R28 and R17 to R22 have radii of curvature, and whose elements have axial thicknesses and separations, substantially as follows:

| Element | Surface | Radius of Curvature | Axial Thickness/Separation |
|---|---|---|---|
| 23 | R23 | 71.5668 | |
| | R24 | 57.2219 | 3.7446 |
| 24 | R25 | 68.8225 | 5.5898 |
| | R26 | 97.2005 | 6.0 |
| 25 | R27 | 273.4474 | 75.8214 |
| | R28 | −4597.7524 | 6.35 |
| 15 | R17 | −43.1559 | 36.7173 |
| | R18 | −103.7221 | 6.8 |
| 16 | R19 | −55.3904 | 2.6457 |
| | R20 | −36.5331 | 13.8148 |
| 17 | R21 | 25.0986 | 0.25 |
| | R22 | 30.4513 | 4.5 |

14. The invention of claim 11 comprising lens elements 26, 27, 28, 15, 16 and 17 whose surfaces R29 to R34 and R17 to R22 have radii of curvature, and whose elements have axial thicknesses and separations, substantially as follows:

| Element | Surface | Radius of Curvature | Axial Thickness/Separation |
|---|---|---|---|
| 26 | R29 | 159.1069 | |
| | R30 | 238.2525 | 8.9619 |
| 27 | R31 | 281.1277 | 88.85 |
| | R32 | 149.2209 | 5.08 |
| 28 | R33 | 54.5642 | 87.814 |
| | R34 | 105.2138 | 3.81 |
| 15 | R17 | −34.0261 | 7.62 |
| | R18 | −263.2878 | 2.54 |
| 16 | R19 | −49.9219 | 4.8014 |
| | R20 | −34.0261 | 12.0382 |
| 17 | R21 | 27.0365 | 0.25 |
| | R22 | 29.1954 | 4.1065 |

15. The invention of claim 11 comprising lens elements 29, 30, 15, 16 and 17 whose surfaces R35 to R38 and R17 to R22 have radii of curvature, and whose elements have axial thicknesses and separations, substantially as follows:

| Element | Surface | Radius of Curvature | Axial Thickness/Separation |
|---|---|---|---|
| 29 | R35 | 163.93456 | |
| | R36 | 218.9659 | 8.8545 |
| 30 | R37 | −137.4706 | 76.60999 |
| | R38 | −145.4383 | 5.7571 |
| | | | 136.9784 |

-continued

| Element | Surface | Radius of Curvature | Axial Thickness/Separation |
|---|---|---|---|
| 15 | R17 | −45.0241 | |
| | R18 | −57.0621 | 3.4948 |
| 16 | R19 | −42.5843 | 1.8163 |
| | R20 | −37.4844 | 8.3768 |
| 17 | R21 | 34.3084 | 0.25 |
| | R22 | 43.0330 | 4.3137 |

16. The invention of claim 10 in which the objective lens system is a catadioptric system including reflecting powered elements.

17. The invention of claim 16 comprising lens elements 11 and 14 to 17 and mirrors 12 and 13 whose surfaces R11 to R22 have radii of curvature, and whose elements have axial thicknesses and separations, substantially as follows:

| Element | Surface | Radius of Curvature | Axial Thickness/Separation |
|---|---|---|---|
| 11 | R11 | −138.0862 | |
| | R12 | −159.2796 | 7.5 |
| 12 | R13 | −217.2779 | 86.9752 |
| 13 | R14 | −159.2796 | −86.9752 |
| 14 | R15 | −88.2180 | 83.3621 |
| | R16 | −80.7690 | 7.2 |
| 15 | R17 | −44.7180 | 38.3071 |
| | R18 | −89.5669 | 6.8 |
| 16 | R19 | −44.3003 | 2.54 |
| | R20 | −36.7068 | 12.2 |
| 17 | R21 | 28.0132 | 0.25 |
| | R22 | 30.4512 | 4.5 |

18. The invention of claim 1 and further comprising an objective lens system for producing a real image from infra-red radiation from a distant scene or object, said "eye-piece" system being arranged to receive infra-red radiation from said real image and to provide a collimated magnified view of the scene or object at a real exit pupil, and scanning and detector means operative at said exit pupil to scan the collimated magnified view via imaging means across infra-red detector means, for use as an infra-red optical system.

19. An "eye-piece" system according to claim 1 in which the infra-red transmitting material is selected from germanium and silicon.

20. An "eye-piece" system according to claim 1 comprising three lens elements 15, 16 and 17 whose surfaces R17 to R22 have radii of curvature, and whose elements have axial thicknesses and separations, substantially as follows:

| Element | Surface | Radius of Curvature | Axial Thickness/Separation |
|---|---|---|---|
| 15 | R17 | −44.7180 | |
| | | | 6.8 |
| | R18 | −89.5669 | |
| | | | 2.54 |
| 16 | R19 | −44.3003 | |
| | | | 12.2 |
| | R20 | −36.7068 | |
| | | | 0.25 |
| 17 | R21 | 28.0132 | |
| | | | 4.5 |
| | R22 | 30.4512 | |

21. An "eye-piece" system according to claim 1 comprising three lens elements 15, 16 and 17 whose surfaces R17 to R22 have radii of curvature, and whose elements have axial thicknesses and separations, substantially as follows:

| Element | Surface | Radius of Curvature | Axial Thickness/Separation |
|---|---|---|---|
| 15 | R17 | −43.1559 | |
| | | | 6.8 |
| | R18 | −103.7221 | |
| | | | 2.6457 |
| 16 | R19 | −55.3904 | |
| | | | 13.8148 |
| | R20 | −36.5331 | |
| | | | 0.25 |
| 17 | R21 | 25.0986 | |
| | | | 4.5 |
| | R22 | 30.4513 | |

22. An "eye-piece" system according to claim 1 comprising three lens elements 15, 16 and 17 whose surfaces R17 to R22 have radii of curvature, and whose elements have axial thicknesses and separations, substantially as follows:

| Element | Surface | Radius of Curvature | Axial Thickness/Separation |
|---|---|---|---|
| 15 | R17 | −34.0261 | |
| | | | 2.54 |
| 16 | R18 | −263.2878 | |
| | | | 4.8014 |
| | R19 | −49.9219 | |
| | | | 12.0382 |
| | R20 | −34.0261 | |
| | | | 0.25 |
| 17 | R21 | 27.0365 | |
| | | | 4.1065 |
| | R22 | 29.1954 | |

23. An "eye-piece" system according to claim 1 comprising three lens elements 15, 16 and 17 whose surfaces R17 to R22 have radii of curvature, and whose elements have axial thicknesses and separations, substantially as follows:

| Element | Surface | Radius of Curvature | Axial Thickness/Separation |
|---|---|---|---|
| 15 | R17 | −45.0241 | |
| | | | 3.4984 |
| | R18 | −57.0621 | |
| | | | 1.8163 |
| 16 | R19 | −42.5843 | |
| | | | 8.3768 |
| | R20 | −37.4844 | |
| | | | 0.25 |
| 17 | R21 | 34.3084 | |
| | | | 4.3137 |
| | R22 | 43.0330 | |

24. An "eye-piece" system for use in a non-Gallilean afocal, infra-red optical system or an afocal infra-red telescope, the "eye-piece" system comprising at least three lens elements including a back element of positive power having a back surface which is either convex or concave and a front surface which is convex, and a pair of singlet elements which are closely spaced to define a gas lens therebetween, the back singlet element of the pair having a convex back surface and the front singlet element of the pair having a concave front surface with an absolute value of radius of curvature equal to or greater than that of the convex back surface of the back singlet chamber of the pair, the pair of singlet elements in combination with the gas lens therebetween being of positive power.

* * * * *